US006282574B1

United States Patent
Voit

(10) Patent No.: US 6,282,574 B1
(45) Date of Patent: *Aug. 28, 2001

(54) METHOD, SERVER AND TELECOMMUNICATIONS SYSTEM FOR NAME TRANSLATION ON A CONDITIONAL BASIS AND/OR TO A TELEPHONE NUMBER

(75) Inventor: Eric A. Voit, Baltimore, MD (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/512,471

(22) Filed: Feb. 24, 2000

Related U.S. Application Data

(63) Continuation of application No. 08/812,075, filed on Mar. 6, 1997, now Pat. No. 6,104,711.

(51) Int. Cl.[7] ....................................... G06F 15/16
(52) U.S. Cl. ................ 709/230; 709/203; 709/250; 370/466; 370/352
(58) Field of Search ...................... 209/230, 250, 209/203; 370/352, 466

(56) References Cited

U.S. PATENT DOCUMENTS

| | | |
|---|---|---|
| 4,734,931 | 3/1988 | Bourg et al. . |
| 4,897,874 | 1/1990 | Lidinsky et al. . |
| 5,185,860 | 2/1993 | Wu . |
| 5,247,571 | 9/1993 | Kay et al. . |
| 5,272,749 | 12/1993 | Masek . |
| 5,425,028 | 6/1995 | Britton et al. . |
| 5,479,494 | 12/1995 | Clitherow . |
| 5,526,489 | 6/1996 | Nilakantan et al. . |
| 5,608,786 | 3/1997 | Gordon . |
| 5,625,675 | 4/1997 | Katsumaru et al. . |
| 5,724,355 | 3/1998 | Bruno et al. . |
| 5,726,984 | 3/1998 | Kubler et al. . |
| 5,812,795 | 8/1998 | Horovitz et al. . |
| 5,858,052 | 9/1999 | Bellovin et al. . |
| 5,953,322 | 9/1999 | Kimball . |

OTHER PUBLICATIONS

"Computer Telephony Over the Internet", Grigonis, Richard, CT and the Net, Mar. 1996.
"Geek of the Week", Karn, Phil et al., Internet Talk Radio, Mobile IP Networking, Nov, 1993.
"How to Build an Internet PBX", McConnell, Brian, http://www/.phonezone.com/ip–phone.htm, pp. 1–9.
"Welcome to the Phone Zone", Pacific Telephone Design, http://www.phonezone.com/index2.htm, pp. 1–6.

(List continued on next page.)

Primary Examiner—Krisna Lim
(74) Attorney, Agent, or Firm—McDermott, Will & Emery

(57) ABSTRACT

An enhanced name translation server, for use on a packet data network such as the Internet, executes a conditional analysis in response to at least some queries or requests for name translations. For example, the server may return a different destination address at different times or in response to translation requests from different terminals. The server also can query a primary destination terminal device, and condition the response to the calling terminal on the status of the primary terminal. For example, if the primary terminal is 'live' the server forwards the address of that terminal to the calling terminal device to set up communications. Otherwise, the server returns alternate destination address information. The server also supports a wide variety of different types of translations, including domain name to address, domain name to telephone number, and telephone number to address. The enhanced translations offer called customers numerous options for controlling communications directed toward them, and the customers may elect to apply these options both to their data communications services and their voice communications services through the packet data network.

30 Claims, 5 Drawing Sheets

OTHER PUBLICATIONS

"Innovations in Internet Telephony: The Internet as the Competitor to the POTS Network", Sears, Andrew, Innovations in Internet Telephony: The Internet as the Successor to the POTS Network, Feb. 28, 1996, pp. 1–6.

"Computer Telephony and the Internet", Stylus Innovation, http://www.stylus.com/hvml.htm.

CT and the 'Net, "Supercharging the Web with Computer Telephony", Mar. 1996.

CT and the 'Net, "Audio and Video Over the Internet", Mar. 1996.

Yang, "INETPhone: Telephone Services and Servers on Internet," RFC 1789, pp. 1–6.

METHOD, SERVER AND TELECOMMUNICATIONS SYSTEM FOR NAME TRANSLATION ON A CONDITIONAL BASIS AND/OR TO A TELEPHONE NUMBER

RELATED APPLICATION

This application is a Continuation of U.S. Ser. No. 08/812,075, entitled "ENHANCED INTERENT DOMAIN NAME SERVER:" filed on Mar. 6, 1997, now U.S. Pat. No. 6,104,711 issued on Aug. 15, 2000.

TECHNICAL FIELD

This invention relates to enhancements of the processing functions performed by a domain name server in association with translation of textual names into routing addresses, for establishing communications via a public packet data network, such as the Internet.

BACKGROUND ART

Attention recently has been directed to implementing a variety of communication services, including voice telephone service, over the worldwide packet data network now commonly known as the Internet. The Internet had its genesis in U.S. Government programs funded by the Advanced Research Projects Agency (ARPA). That research made possible national internetworked data communication systems. This work resulted in the development of network standards as well as a set of conventions, known as protocols, for interconnecting data networks and routing information across the networks. These protocols are commonly referred to as TCP/IP. The TCP/IP protocols were originally developed for use only through ARPANET but have subsequently become widely used in the industry. TCP/IP is flexible and robust. TCP takes care of the integrity, and IP moves the data.

Internet provides two broad types of services: connectionless packet delivery service and reliable stream transport service. The Internet basically comprises several large computer networks joined together over high-speed data links ranging from ISDN to T1, T3, FDDI, SONET, SMDS, ATM, OT1, etc. The most prominent of these national nets are MILNET (Military Network), NSFNET (National Science Foundation NETwork), and CREN (Corporation for Research and Educational Networking) In 1995, the Government Accounting Office (GAO) reported that the Internet linked 59,000 networks, 2.2 million computers and 15 million users in 92 countries. However, since then it is estimated that the number of Internet users continues to double approximately annually.

In simplified fashion the Internet may be viewed as a series of packet data switches or 'routers' connected together with computers connected to the routers. The Information Providers (IPs) constitute the end systems which collect and market the information through their own servers. Access providers are companies such as UUNET, PSI, MCI and SPRINT which transport the information. Such companies market the usage of their networks.

FIG. 5 shows a simplified diagram of the Internet and various types of systems typically connected thereto. Generally speaking the Internet consists of Autonomous Systems (AS) type packet data networks which may be owned and operated by Internet Service Providers (ISPs) such as PSI, UUNET, MCI, SPRINT, etc. Three such AS/ISPs appear in FIG. 5 at 310, 312 and 314. The Autonomous Systems (ASs) are linked by Inter-AS Connections 311, 313 and 315. Information Providers (IPs) 316 and 318, such as America Online (AOL) and Compuserve, connect to the Internet via high speed lines 320 and 322, such as T1/T3 and the like. Information Providers generally do not have their own Internet based Autonomous Systems but have or use Dial-Up Networks such as SprintNet (X0.25), DATAPAC and TYMNET.

By way of current illustration, MCI is both an ISP and an IP, SPRINT is an ISP, and the MicroSoft Network (MSN) is an IP using UUNET as an ISP. Other information providers, such as universities, are indicated in exemplary fashion at 324 and are connected to the AS/ISPs via the same type connections here illustrated as T1 lines 326. Corporate Local Area Networks (LANs), such as those illustrated in 328 and 330, are connected through routers 332 and 334 and high speed data links such as T1 lines 336 and 338. Laptop computers 340 and 342 are representative of computers connected to the Internet via the public switched telephone network (PSTN) and are shown connected to the AS/ISPs via dial up links 344 and 346.

In the addressing scheme of the Internet, an address comprises four numbers separated by dots. This is called the Internet Protocol address, or IP address. An example of an IP address would be 164.109.211.237. Each machine on the Internet has a unique number assigned to it which constitutes one of these four numbers. In the IP address, the leftmost number has the greatest weight. By analogy t his would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router.

When a pack et bearing a destination address leaves the source router, the router examines the first two numbers in a matrix table to determine how many hops are the minimum to get to the destination. It then sends the packet to the next router as determined from that table, and the procedure is repeated. Each router has a database table that find s the information automatically.

This continues until the packet arrives at the destination computer. The separate packets that constitute a message may not travel the same path depending on traffic load. However, they all reach the same destination and are assembled in their original order in a connectionless fashion. This is in contrast to connection oriented routing modes, such as frame relay and ATM or voice.

It would be difficult for most people to remember the four separate numbers (sometimes having ten or more digits) comprising each numeric IP address. In addition numeric IP addresses occasionally change, making it even more of a problem for people to keep track of them. The Domain Name System (DNS) was developed to provide some relief from these problems. In the DNS system words, which are more easily remembered, are used instead of numbers.

An example of a textual Domain Name is Evoit@HUT.MB.COM. Each of the names separated by a dot is called a domain. The significance of each of the domains is the reverse of that of the numeric IP address. In the numeric IP address, the most significant numbers were on the left and the least significant on the right. The textual Domain Name System begins with the least significant on the left and proceeds to the most significant on the right.

The top-level domains, those of the most general significance, are as follows:

1. COM A commercial operation
2. EDU A university, college or other educational institution
3. GOV A government organization
4. MIL A military site
5. ORG Any organization that does not fit into any of the preceding
6. NET A network There are now two-letter domains, each denoting a different country, which are atop the above original domain names. An address ending in "COM.AU," for example, would be a commercial operation in Australia. Over a hundred different countries are now connected to the Internet so the list of two-letter country codes is long and getting longer. Computers associated with the Internet called domain name servers convert textual domain names into numeric IP addresses.

The domain name processing by the domain name servers has always involved only a straight translation from the domain name to a single IP address. The domain name servers have not offered any type of customized processing or control to meet individual needs of parties identified by domain name addresses.

Recently, one or more companies have developed software for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line, in some cases as low as 2.4 kbits/s. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers.

Such programs have relied on servers coupled to the Internet to establish voice communication links through the networks. Each person active on the network, who is willing to accept a voice call, must register with a server. A calling party can call only those persons registered on the voice communication server. Also, the address management provided by these servers, like that provided by the domain name servers, has not permitted any individualized control of routing. For example, a user could register only one current address and must reregister each time the user comes on-line with a new address. The registration server provides no automatic selection of alternate destinations.

Concurrent with recent developments in public packet data communications such as the Internet, outlined above, the telephone industry has been developing an enhanced telephone network, sometimes referred to as an Advanced Intelligent Network (AIN), for providing a wide array of new voice grade telephone service features. In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via a common channel interoffice signaling (CCIS) link to a database system, such as an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call. An AIN type network for providing an Area Wide Centrex service, for example, was disclosed and described in detail in commonly assigned U.S. Pat. No. 5,247,571 to Kay et al., the disclosure of which is entirely incorporated herein by reference.

As shown by the art discussed above, the Internet and the AIN have remained separate, independent areas of technical development. Many telephone service subscribers are accustomed to enhanced telephone features, such as those provided by AIN processing. However, the wide range of conditional routing options offered by AIN type processing have simply not been available on the Internet. For example, the address processing provided by the domain name servers and the registration servers used to exchange addresses for voice communication have not permitted alternate treatments for different times, different calling parties, different destinations of roaming subscribers, etc.

As use of the Internet expands, particularly for transport of voice telephone communications, a need exists for enhanced address management that will facilitate advanced routing features through the public packet data network to offer customers using that network service features similar to those commonly available via the AIN and other advanced telephone networks.

DISCLOSURE OF THE INVENTION

The present invention addresses the above stated needs by providing enhancements to the address processing of a domain name server or the like.

One objective is to provide a name or address server for translating textual domain names into telephone numbers.

Another objective is to provide a name or address server for conditioning name-to-address processing on certain parameters relating to a request for translation, such as the time of the request, the party or terminal making the request, the status of one or more potential destination terminals, etc.

Another object relates to providing different addresses in response to a request for translation of one name, for example where conditions surrounding a request for translation differ.

The present invention relates to an enhanced server for translation of names or the like into address information, networks or systems utilizing such a server and methods of translating names or the like into address information, to provide customers a wide range of sophisticated routing options through a public packet data network, such as the Internet.

In one aspect, the present invention relates to a name server, comprising an interface, a central processing unit and a data storage system. The interface couples the name server to a system of interlinked packet data networks using packet addresses defined in a first protocol. The name server also includes software running on the central processing unit. Under control of the software, the server processes a query for translation of a name specified in a second protocol, for example a textual domain name. In response to the query, the server generates a reply message for transmission via the interface. The software controls the computer to include a first destination address conforming to the first protocol in the reply message, if parameters relating to the query satisfy a first criteria defined in a routing control record stored in the data storage system. The software controls the computer to include information relating to a second destination in the reply message if parameters relating to the query satisfy a second criteria defined in the routing control record.

Effectively, each device that queries the name server receives back one set of address information in response to each query, and each calling device uses that information to establish communication through the network. The provision of different address information under different conditions in response to name translation requests permits selective routing of communications through the network to different destinations. The called party can subscribe to a selective routing service, and the selective routing service is customized to meet the subscriber's individual routing needs by customizing the routing control record that controls the conditional analyses responsive to translation requests relating to that customer's name.

In the preferred embodiment, the interlinked packet data networks form a public, packet switched data network, such as the Internet; and the first protocol is Internet Protocol (IP). The name server is an enhanced implementation of a domain name server. In such an embodiment, the address for the first destination typically is an IP address. However, if the name relates to a telephone service customer, the address of the first destination may include a telephone number. The address information for the second destination may include an address, such as an IP address; the address information may include a telephone number; or the address information may include both an address and a telephone number.

Another aspect of the present invention relates to determination of the status of a destination terminal. In this regard, the software of the name server controls the server to send a status query via the network to a destination terminal device associated with a name included in the query for translation. The server computer includes an address of the destination terminal device conforming to the first protocol in a reply to the query for translation, only if the computer receives a predetermined reply from the destination terminal.

For example, if there is no reply from the terminal within some time period or the terminal sends back a reply indicating that the communication should not be completed to that terminal, the name server will transmit an appropriate message back to the system that initially requested the translation. In the preferred embodiments, that message will include address information relating to an alternate destination.

The name server in accord with the present invention also will process translation requests based at least in part on time. In this regard, the software running on the central processing unit causes the name server to formulate and transmit a reply to a name translation request. Specifically, the central processing unit includes an address of a destination terminal device associated with the name in the reply if the name server receives the name translation request within a predetermined time window.

In the preferred embodiment, the domain name server transmits different destination address information (IP address and/or telephone number) depending on which of two or more time windows covers the time of arrival of each translation request. In this manner, the customer can have the server return different address information at different times of the day, week or month. As a result, parties seeking to communicate with someone having one name on the network, actually receive instructions to communicate with two or more alternate destinations at different times. For example, the communications might go to the customer's office during office hours and to the home at other times.

The present invention relates both to data services and to voice telephone services, using the interlinked data networks to transport digitized voice communications. To support enhanced routing on both data and telephone type calls, the name server performs an expanded variety of translations. Thus, some translations by the server translate a textual domain name into a numeric IP address, but the server will also translate telephone numbers into IP addresses and/or domain names into telephone numbers (alone or in combination with an IP address).

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

The present invention utilizes enhanced processing, responsive to name translation requests, to provide selective routing services through a public packet switched data network. The inventive name processing can apply to any translation of a name into address or routing information for a packet data network, such as name to address translation in a telephone service registration server. The preferred embodiments, discussed below, relate to domain name processing. As such, the selective routing can apply to any communications via the network that rely on domain name addressing, such as E-mail and web page access through the Internet. However, the selective routing is particularly advantageous for processing of voice telephone communications through the packet data network based on domain name translations.

Figure 1:
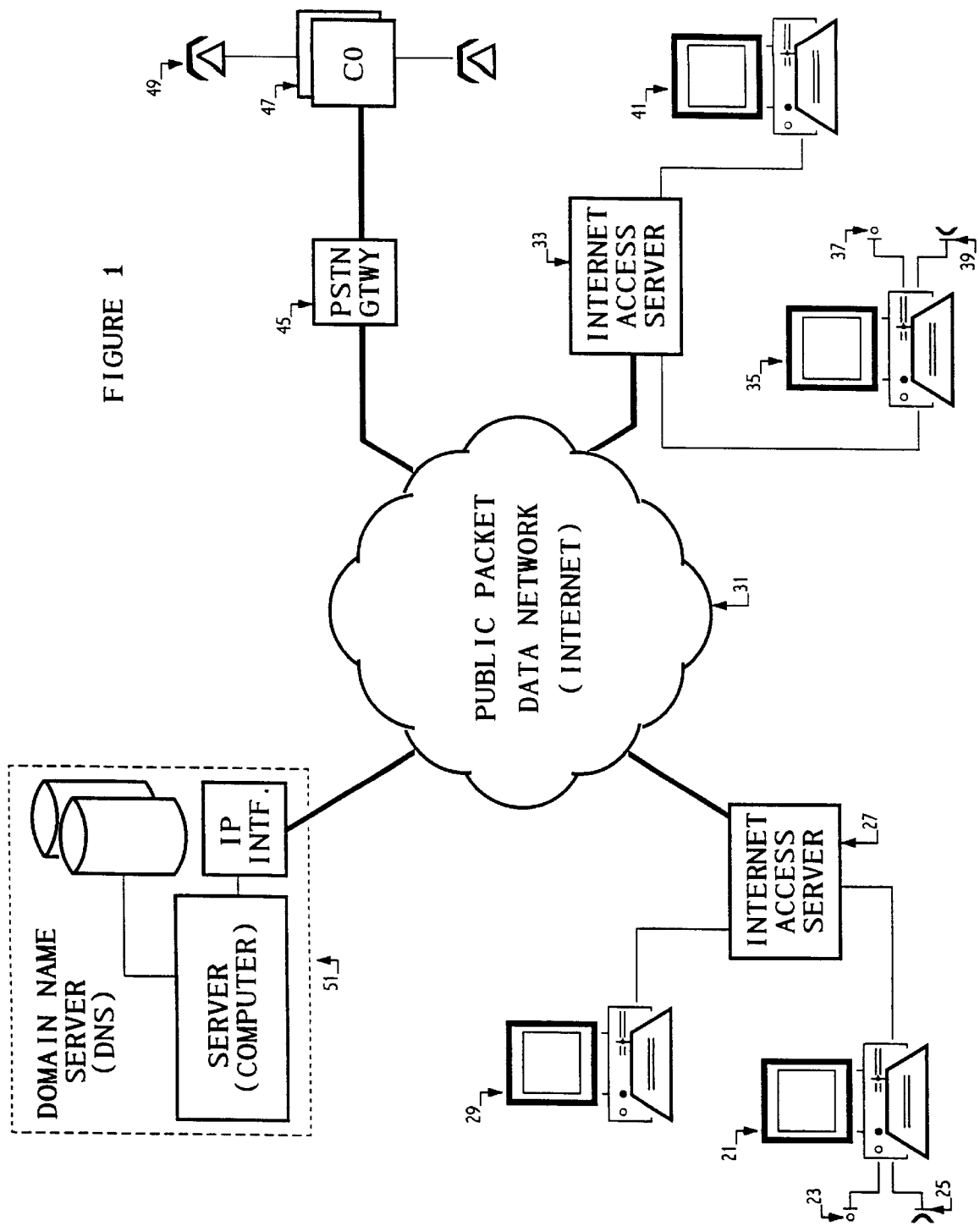
FIG. 1 is a simplified diagram of an Internet system with both data and telephone communication capabilities relying on the enhanced name processing in accord with the present invention.
Figure 5:
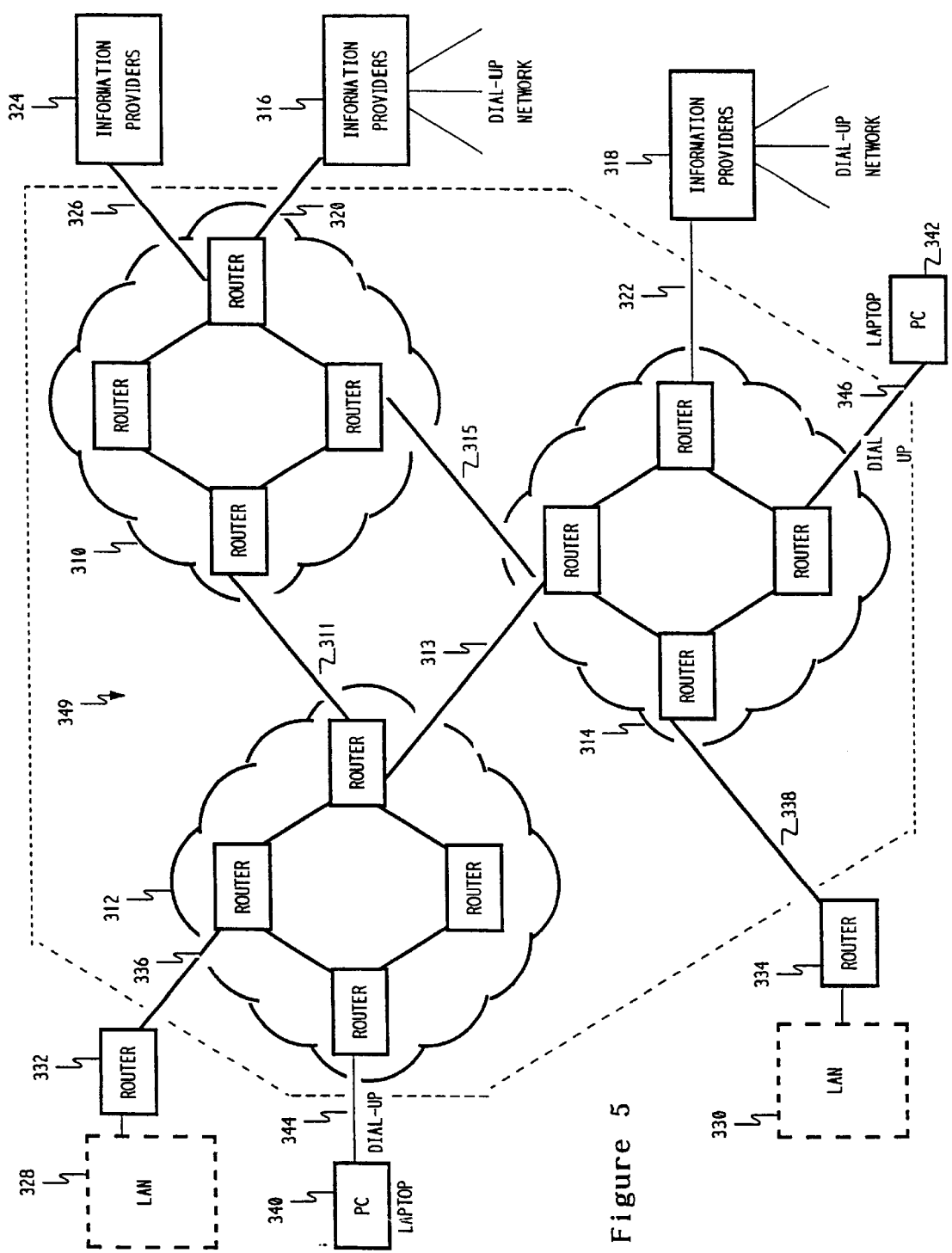
FIG. 5 is a block diagram of the Internet.

FIG. 1 depicts a public packet data network 31 as a cloud. The network utilizes Internet Protocol (IP) based packet switching to route data packets between source and destination nodes coupled to the network. In is the preferred embodiment, the public packet data network 31 is a wide area data network formed of a number of interlinked networks, such as the international network now commonly referred to as the 'Internet'. The preferred network 31 comprises a network of interconnected routers and networks, such as shown in FIG. 5 and discussed above. A variety of computers and servers (not shown for simplicity) connect to the network 31, for example for providing web site services. Terminal devices communicate with the computers and servers as well as with each other. For simplicity, FIG. 1 shows for personal computer (PC) type terminal devices 21, 29, 35 and 41.

Each of the PCs connect to the network 31 through an Internet access server 27 or 33. The server 27 or 33 aggregates traffic to and from the associated terminal devices for transport over a relatively high-speed link to the packet switched data network 31. The Internet access server 27 or 33 provides a compatible interface to the respective PCs (modem, ISDN or LAN) and protocol conversion and interfacing, as necessary, for two-way data communication over the particular high speed link to the packet data Internet.

For example, the server 27 may comprise a modem bank coupled to the public switched telephone network (not shown) and coupled through a high speed link to an IP router within the network 31. In such an implementation, the PCs 21 and 29 would have analog modems for dial-up communications with the server 27. For communications with the PCs 21, 29, the server would provide point to point protocol (PPP).

As another example, the Internet access server 33 might communicate over a 10baseT Ethernet LAN with the PCs 35, 41. In this example, the PCs 35, 41 would include Ethernet LAN type interface cards and would connect through appropriate wiring to the Internet access server 33. The server 33 would provide two-way protocol conversions, as necessary for IP communications over the network 31 and would connect via a high speed link to an IP router within the network 31. The server 33 might also provide gateway and firewall functions, to control outside access to the LAN and controlled access from the PCs 35, 41 on the LAN to the public network 31.

The various PCs include processors, memories, various disc drives, etc. Each of the PCs also includes a display or monitor, a keyboard, and possibly one or more additional user input devices (not shown) such as a mouse, joystick or track ball. Typically, the software running on the PCs includes an operating system, such as Windows '95 and a series of compatible applications programs running under the operating system. The software implements a graphical user interface, including a user interface for communications through the public packet data network 31.

Many of the PCs also have voice communication capabilities. For example, PCs 21 and 35 includes microphones 23, 37 and speakers 25, 39. These PCs also include analog to digital and digital to analog converters, and the CPUs in such PCs run software for compression and decompression of digitized audio (typically voice) information. The software also processes the audio information for transmission and reception of the compressed digital information in IP packets and using the appropriate protocol for communication with the respective access server.

PCs having voice communication capabilities can conduct two-way, real-time audio communications with each other, in a manner directly analogous to a two-way telephone conversation. However, the actual signals exchanged between two such terminal devices go through the public packet data network 31 and the appropriate access servers 27, 33. Typically, such communications at least bypass long distance interexchange carriers. In the example given above, the PC 21 connects to the Internet access server 27 through a dial-up telephone connection through a local carrier telephone network (not shown). The PC 35 connects to the Internet access server 33 via a LAN. Voice communications between the PC 21 and the PC 35 would utilize a local telephone link (between PC 21 and server 27), but the rest of the communication link would go through the public packet data network 31 and the LAN. If both PCs connect to the Internet via a LAN or other data network, the audio communications may not utilize the telephone network at all.

Those PCs which have voice communication capabilities may also send and receive telephone calls via the public switched telephone network to persons using standard telephones 49. For this purpose, the public packet data network 31 connects to a number of PSTN gateways in different service areas, although only one such gateway 45 appears in FIG. 1. Each gateway 45 connects to one or more central offices 47 of the public switched telephone network in the region where the gateway 45 is located. Calls through such gateways typically bypass the long distance interexchange carrier and may utilize a data network connection to one PC, as in the earlier example.

The PSTN gateway 45 provides a voice telephone grade interface to the public packet data network 31, for a large number of calls, between telephone networks such as the PSTN and/or cellular or PCS type mobile telephone networks. Typically, such a gateway 45 will connect to at least one central office (CO) 47 of the PSTN via one or more primary rate interface type ISDN line groups or a combination of one or more T1 circuits and a Simplified Message Desk Interface type signaling circuit. The line circuits provide digital line interconnections of the gateway 45 to the central office 47. The PSTN gateway 45 includes one or more computers for processing individual calls. The computer(s) include appropriate line interfaces for answering incoming calls and initiating outgoing calls over the particular type of line circuits. The interfaces also receive and decode standard signaling messages from the PSTN, e.g. DTMF dialing signals, and detect line status and call progress signals on incoming and outgoing calls. Each of the computer(s) in the gateway 45 runs software to compress incoming audio signals from the PSTN in a standardized format and decompress digital audio signals in that format received via the public packet data network 31, for transmission over the PSTN. The computer(s) also perform the two-way protocol processing to send and receive compressed, digitized voice data in TCP/IP packet form over the network 31. The PSTN gateway 45 includes or connects to a router coupled to the public packet data network 31. Copending commonly assigned application Ser. No. 08/634, 543 filed Apr. 18, 1996 describes several implementations of 'Internet Modules' which may serve as alternate embodiments of the PSTN gateway 45.

Communications via the public packet data network 31, such as the Internet, utilize IP protocol addressing. As discussed above, each such address comprises a series of four numbers separated by dots. To facilitate person to person communications, however, people can address each other using easier to remember names. In the presently preferred embodiments, these names may be textual domain names or telephone number based domain names, but other name formats are within the scope of the invention. A domain name server system 51 translates the names into actual IP addresses. In accord with one aspect of the present invention, the translation may also provide other related information such as an alternate telephone number.

As shown in simplified form in FIG. 1, the domain name server (DNS) 51 comprises a server computer which functions as the central processing unit of the domain name server. The computer has an IP packet data interface to the network 31. The DNS system 51 also includes a data storage system storing a series of databases attached to or incorporated into the server. As discussed more below, the databases include look-up tables for direct translations of names to addresses and routing control records for conditional processing of requests for communication with at least some customers.

Essentially, when a person wishes to initiate a communication, they instruct their PC to start communication using a name address. The PC transmits a name translation request or 'query' to the domain name server system 51 via the appropriate access server and the network 31. The server S receives the a domain name query from the public packet data network 31. In response, the server may execute a direct look-up table based translation to an IP address or telephone number. However, for any called party customer who has established a more sophisticated routing service, the server 51 will execute conditional analysis in response to the domain name translation query.

In its simplest form, if the conditional analysis produces a first result, the server 51 translates a name included in the query (e.g. domain name or telephone number based name) into a first destination IP address. If the conditional analysis produces a second result, the server 51 translates the name included in the query into a second destination IP address. The server then transmits a response message containing the first or the second destination address to a calling PC. The PC uses the received IP address to establish the desired communication through the public packet data network 31.

The name processing may apply to data communications as well as to voice telephone type communications through the packet data network 31. Also, the conditional analysis name processing may utilize a variety of criteria relating to the communication, such as the identity of the calling party or terminal, the time, the status of a primary destination terminal, etc. The conditional processing by the domain name server 51 will support a wide array of selective routing services, such as routing to different destinations at different times, routing to an alternate destination if a primary destination is inactive, follow-me type service, etc. Several more specific routing examples will be discussed in detail later.

Figure 2:
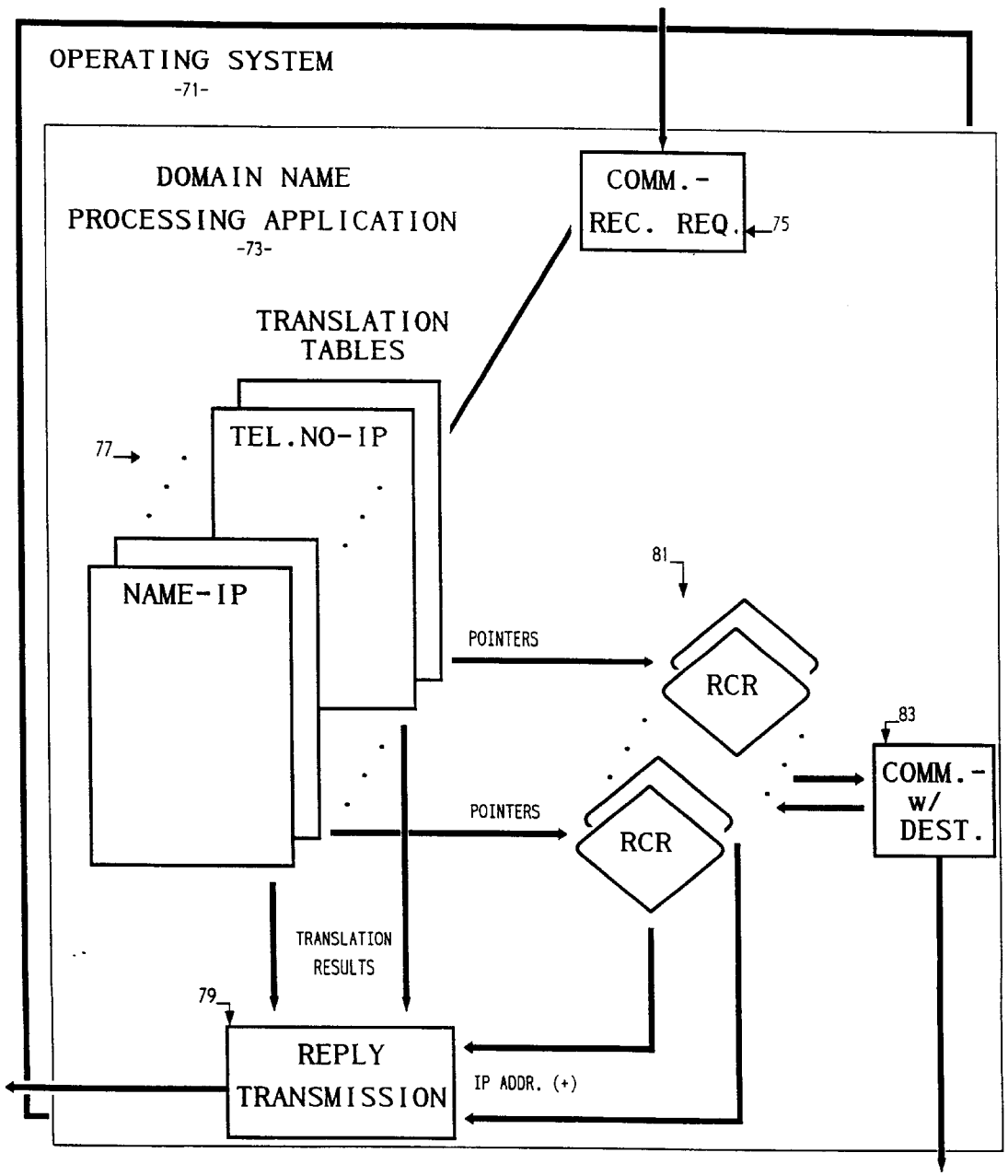
FIG. 2 provides a simplified functional illustration of certain software elements of a domain name server system, useful in explaining the enhanced name processing of the present invention.

FIG. 2 provides a simplified illustration of an example of one possible organization of the software for the domain name server 51, for implementing the enhanced operations in accord with the present invention. The computer of the domain name server runs a standard operating system 71, such as UNIX. The operating system facilitates execution of one or more applications. One of the applications that will run on the computer of the domain name server 51 is a domain name processing application 73. The domain name processing application 73 includes executable code facilitating the actual processing. The executable code permits access to translation tables 77 and routing control records (RCRs) 81 stored in a database within the storage system portion of the domain name server 51. The executable code of application 73 also triggers several communication routines 75, 79 and 83.

More specifically, when the computer of the domain name server 51 receives a 'query' or request for name translation, the operating system 71 passes the request from the IP interface to the communication routine 75 of the application 73. The communication routine extracts the appropriate information from the query message, such as the address of the requesting terminal device and the name that the terminal device has identified for translation.

The domain name processing application 73 can access a number of translation tables. Some of the tables will translate domain names into IP addresses. A name requiring access to this type of table is 'eric.voit@phone'. Other tables will translate telephone numbers or names incorporating telephone numbers into IP addresses. A number based name requiring access to this type of table is '301-608-2908@phone'. The domain name processing application 73 examines the name information supplied by the communication routine 75 to identify the appropriate translation table and uses the name to access the translation entry corresponding to the name.

In accord with one aspect of the present invention, certain translations of domain names will result in a response or reply message containing a destination telephone number. In the preferred embodiment discussed below, the conditional analysis processing for at least some called parties may result in identification of a telephone number in response to a domain name translation request, depending on certain parameters relating to the particular query. However, the domain name server may translate names into telephone numbers in other ways. Although not shown, the translation tables may include one or more tables for translating domain names directly into telephone numbers.

Some name translations will result in a direct translation into an IP address, in a manner similar to existing procedures for translation of a textual domain name into an IP address. In such cases, the domain name processing application 73 will supply the IP address resulting from the translation from the appropriate table 77 to a communication routine 79 for transmission of a reply message to the terminal device that requested the translation. The application 73 also provides the address of that terminal device to the reply transmission routine 79. In response, the routine 79 will formulate an IP reply message containing the terminal device address as the destination address and containing the IP address produced by the translation process as message data. The reply transmission routine 79 forwards the message through operating system 71 and the IP interface for transmission through the public packet data network 31 to the requesting terminal device. The requesting terminal device then initiates the desired communication using the destination address.

Certain parties or customers will desire and subscribe to a variety of routing services requiring conditional analysis type processing. For each of those customers, the domain name server will store a routing control record (RCR) 81. For each name associated with such a customer, the translation tables 77 will store a pointer pointing to the routing control record (RCR) 81 that controls that customer's routing service.

The domain name processing application 73 will receive a query in the manner discussed above. However, when the application accesses the translation table with the name associated with a customer have conditional analysis based service, the translation will return a pointer identifying the controlling RCR. The domain name processing application 73 then executes a conditional analysis routine utilizing the identified RCR 81. The conditional analyses defined by the RCRs vary considerably, depending on the customized routing service selected by each customer. Several simple examples are described for convenience.

In the simplest form, the RCR specifies a set of conditions or criteria and two or more alternate destinations, depending on which criteria are satisfied by the current call or translation request query. For example, the RCR may specify alternate destination addresses for different times, or for different addresses of the terminal that requested the translation. In these cases, the domain name processing application 73 compares call or query related parameters to the criteria in the RCR 81 and obtains the destination address corresponding to the parameters of the current call or translation query. Here, the address may be an IP address, other routing information (e.g. telephone number) or a combination of the IP address plus some other routing information.

The domain name processing application 73 will supply the result from the RCR processing (IP address and/or other routing information) to the communication routine 79. The transmission reply routine transmits a reply message to the terminal device that requested the translation, in the manner discussed above. However, in this case, the reply message contains the IP address and/or other routing information obtained from the RCR processing. The requesting terminal device initiates the desired communication in the normal manner but using the address information obtained as a result of the conditional analysis. In this manner, the communication ultimately goes to the destination selected by the called party who established the customized routing service and the corresponding RCR in the domain name server 51.

Some of the customers will desire still more complicated conditional analysis processing, and for those customers the RCRs 81 will cause the domain name processing application 73 to call other routines. Consider one example. A customer has elected a routing service that depends in part on an analysis of the status of the customer's primary terminal, e.g. whether or not that terminal device is on. In such a case, the customer's RCR would point to a communication routine 83. The routine 83 would transmit a query through the public packet data network 51 to the customer's primary terminal asking if that terminal is 'live'. If the terminal responds, then the RCR causes the domain name processing application to output the address of the primary terminal to the reply transmission routine 79, for transmission to the requesting terminal device. If the primary terminal device does not respond within a set time period (e.g. because it is off), then the RCR will supply an address and/or other routing information for an alternate destination. The domain name server 51 may query the alternate destination in a similar manner, or the application 73 may supply the information regarding the alternate destination to the reply transmission routine 79, for transmission to the requesting terminal device, depending on the customer's RCR.

It may be helpful, at this point, to consider several examples of specific communications through the public packet data network utilizing the enhanced domain name server and translation processing in accord with the present invention.

In a first example, assume that a person at PC 29 wants to send a message to a person at PC 41, for example an E-mail message. Assume also that the person normally at PC 41 has elected a simple alternate routing service. If the person's terminal device, PC 41, is active or 'live', then the person wants messages directed to that device 41. If the PC 41 is inactive, then the person wants message directed to an alternate terminal normally operated by someone who may be able to respond immediately during the customer's absence.

In this example, an operator sitting at her personal computer 29 enters the called person's domain name address, which is a textual address such as 'eric.voit@phone' or a telephone number based name such as '301-608-2908@phone'. Her personal computer 29 transmits a query containing the entered name through the Internet access server 27 and the public packet data network 31 to the domain name server 51.

Figure 3:
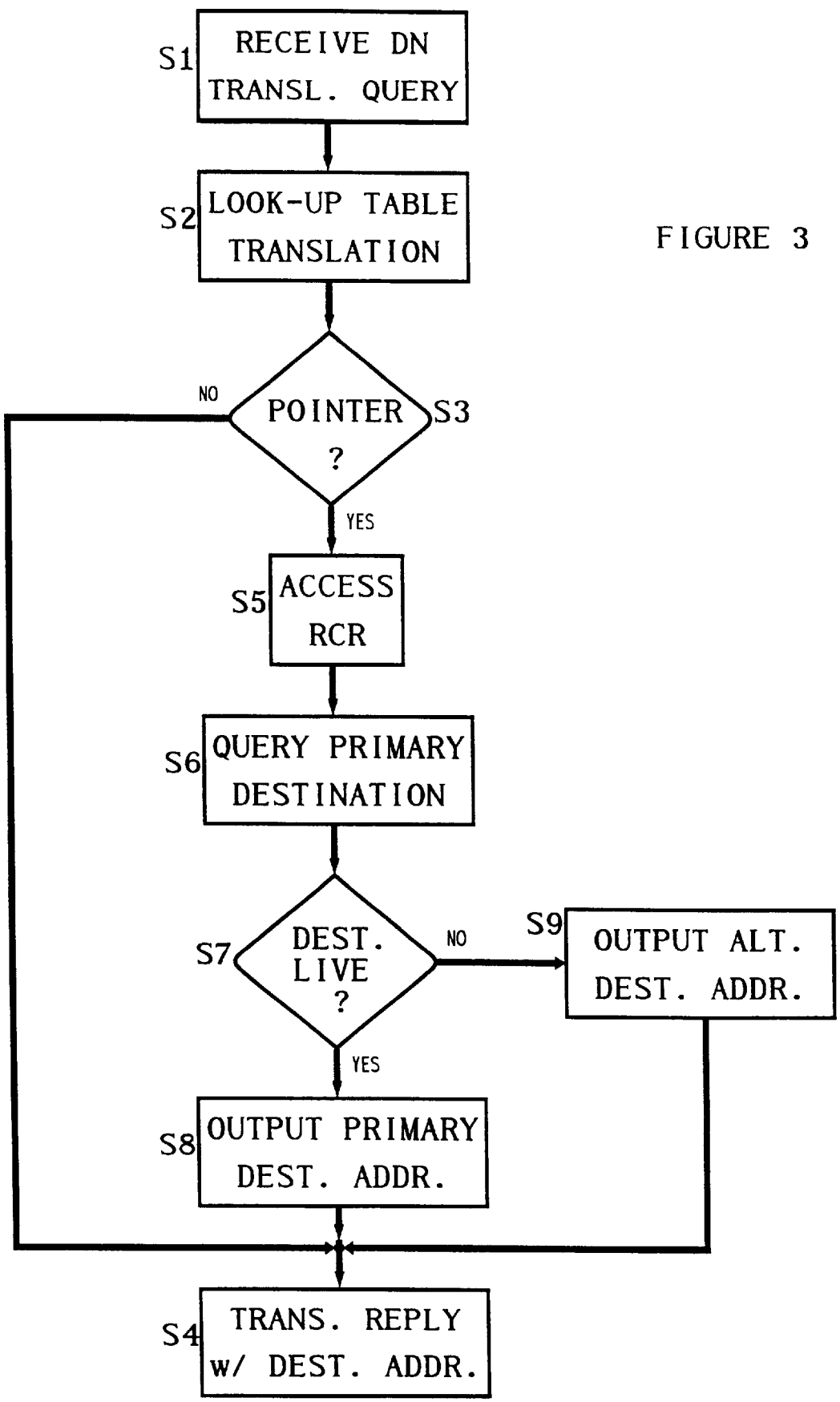
FIG. 3 is a simplified process flow diagram illustrating the steps for implementing a first selective routing service as part of the domain name processing in accord with a preferred embodiment of the present invention.

FIG. 3 provides a simplified illustration of the processing flow by the domain name server in response to this query message. In step S1, the domain name server receives the query or request for translation. The server accesses the appropriate translation table and performs a translation (step S2). Processing branches at step S3. If there is no pointer, the translation produced an actual destination address. The domain name server therefore transmits a reply (step S4) containing the destination IP address, back to the calling party's PC 29. The PC 29 would use the received IP address to send the desired message.

However, in the current example, the called party has a conditional routing service. The translation in step S2 therefore retrieves a pointer and step S3 branches processing to step S5 wherein the domain name server accesses the RCR identified by the pointer. From this point on, the domain name server processes the translation request based on the called party's RCR. In our present example, the RCR would cause the domain name server to transmit a query message to the PC 41, the primary destination terminal device identified in the RCR (step S6).

Processing branches again at step S7, depending on whether or not the primary destination terminal is 'live'. The terminal device is 'live' if it is active and accepting communication. In such a case, the PC 41 would respond with an affirmative message. The RCR therefore would cause the domain name processing to output the IP address of the primary destination terminal device, the PC 35 (step S8), for transmission in the reply message (step S4). In these circumstances, the PC 29 would use the received IP address to send the desired message to the PC 41.

At step S7, the domain name server may find that the primary destination terminal device, PC 41, is not 'live' at this time. For example, the PC may not respond within a predetermined time limit. Alternatively, the PC may respond with a message indicating either that the called party is not accepting messages or does not want to accept a message from the present caller. When the primary destination terminal device is not 'live', step S7 branches to step S9, and the domain name server outputs at least an IP address for an alternate destination. In the simplest case, the RCR identifies the one alternate destination, although a variety of more sophisticated processing methodologies can be used to identify the alternate destination. Assume here the simplest case in which the RCR simply identifies a single alternate destination, and in this example assume specifically that the RCR identifies the IP address of the PC 35 as the alternate address. The RCR therefore would cause the domain name processing to output the IP address of PC 35 in step S9, and the server would transmit the reply message containing that address in step S4. Under these conditions, the PC 29 would use the received IP address to send the desired message to the PC 35.

As shown by the above example, the domain name server processing produces different results in response to a query relating to a single customer's name based on different conditions or circumstances, in this case whether the primary destination terminal is 'live' at the time of the request for translation.

The domain name server would process queries relating to voice communications through the network 31 in essentially the same manner, for example for a voice call from a person using PC 21 to a person whose primary destination terminal is the PC 35.

In this second example, an operator sitting at her personal computer 21 enters that person's domain name address, which is a textual address or a telephone number based name. Her personal computer 21 transmits a query containing the name through the Internet access server 27 and the public packet data network 31 to the domain name server 51. Again, the domain name server receives the query or request for translation (step S1). The server accesses the appropriate translation table and performs a translation (step S2), and processing branches at step S3. If there is no pointer, the translation produced an actual destination address. The domain name server therefore transmits a reply (step S4), containing the destination IP address, back to the calling party's PC 21; and that PC uses the received IP address to initiate the desired voice communications.

Assume now that the called party associated with PC 35 has a conditional routing service. The translation in step S2 therefore retrieves a pointer, and step S3 branches processing to step S5 wherein the domain name server accesses the RCR identified by the pointer. Assume in this example, that the first element of the conditional processing is a determination of whether the primary destination terminal device is 'live'. In a manner similar to the earlier example, the RCR would cause the domain name server to transmit a query message to the PC 35, the primary destination terminal device identified in the RCR (step S6).

If the primary destination terminal (PC 35) is 'live,' then processing branches from step S7 to step S8. The RCR causes the domain name processing to output the IP address of the primary destination terminal device, the PC 35, and the domain name server transmits that address in the reply message (step S4). The PC 21 uses the received IP address to initiate voice communications with the PC 35 through the public packet data network 31.

If the domain name server determines that the primary destination terminal (PC 35) is not 'live,' in one of the ways outlined above, then processing branches from step S7 to step S9. A variety of procedures could be used to select an alternate destination. For example, the customer might periodically provide a current telephone location for registration in the customer's RCR, so that voice calls would follow the customer where ever the customer might travel. Alternatively, a roaming subscriber with a laptop might obtain a new IP address each time that subscriber dials in to an Internet Service Provider from a different geographic location, and an access server operated by the Service Provider and/or the laptop would communicate with the domain name server 51 to update the address stored in association with that subscriber's domain name. An example of a 'follow-me' type service is disclosed in more detail in commonly assigned copending application Ser. No. 08/811,032, filed Mar. 04, 1997 entitled Internet Phone to PSTN Cellular/PCS System, now U.S. Pat. No. 6,075,783 issued on Jun. 13, 2000, the disclosure of which is incorporated herein entirely by reference.

For simplicity, assume that the called party wants all incoming calls when PC 35 is not 'live' routed to a telephone 49, for example a secretary's telephone. At step S9, the domain name server outputs information identifying the alternate destination. In the present example, the RCR identifies the IP address of the PSTN gateway 45 and the telephone number of the line to telephone 49, and this information is output for transmission to the PC 21 in step S4. The PC 21 uses the received information, e.g. the IP address and the telephone number, to establish voice communications with the alternate destination.

The PC 21 would initiate a signaling communication through the Internet access server 27 and the public packet data network 31 with the PSTN gateway 45, using the IP address received from the domain name server 51. As part of the signaling communication, the PC 21 would supply the telephone number to the PSTN gateway 45. The PSTN gateway 45 would initiate a voice telephone call to the telephone 49 through one or more COs 47 of the local public switched telephone network. If the line to telephone station 49 is busy, the CO(s) 47 return a busy signal. The gateway 45 detects this signal and transmits an appropriate message back to the PC 21 causing the PC to inform the caller of the 'busy' condition. However, if a person answers the telephone 49, the PSTN gateway 45 initiates a voice communication session through the public packet data network 31 and the Internet access server 27 to the PC 21 and provides a communication link between that packet data network session and the call through the PSTN to telephone 49. After this session set-up, the user at PC 21 can talk to the answering party at telephone station 49, in a normal conversational manner.

The conditional analysis processing in accord with the present invention can selectively route communications through the public packet data network based on a variety of different call related parameters. As another example, consider conditional routing based the time of the call. Such processing may apply to data communications, to route E-mail or other data communications to different destinations at different times. However, for purposes of discussion consider application to voice call processing.

Figure 4:
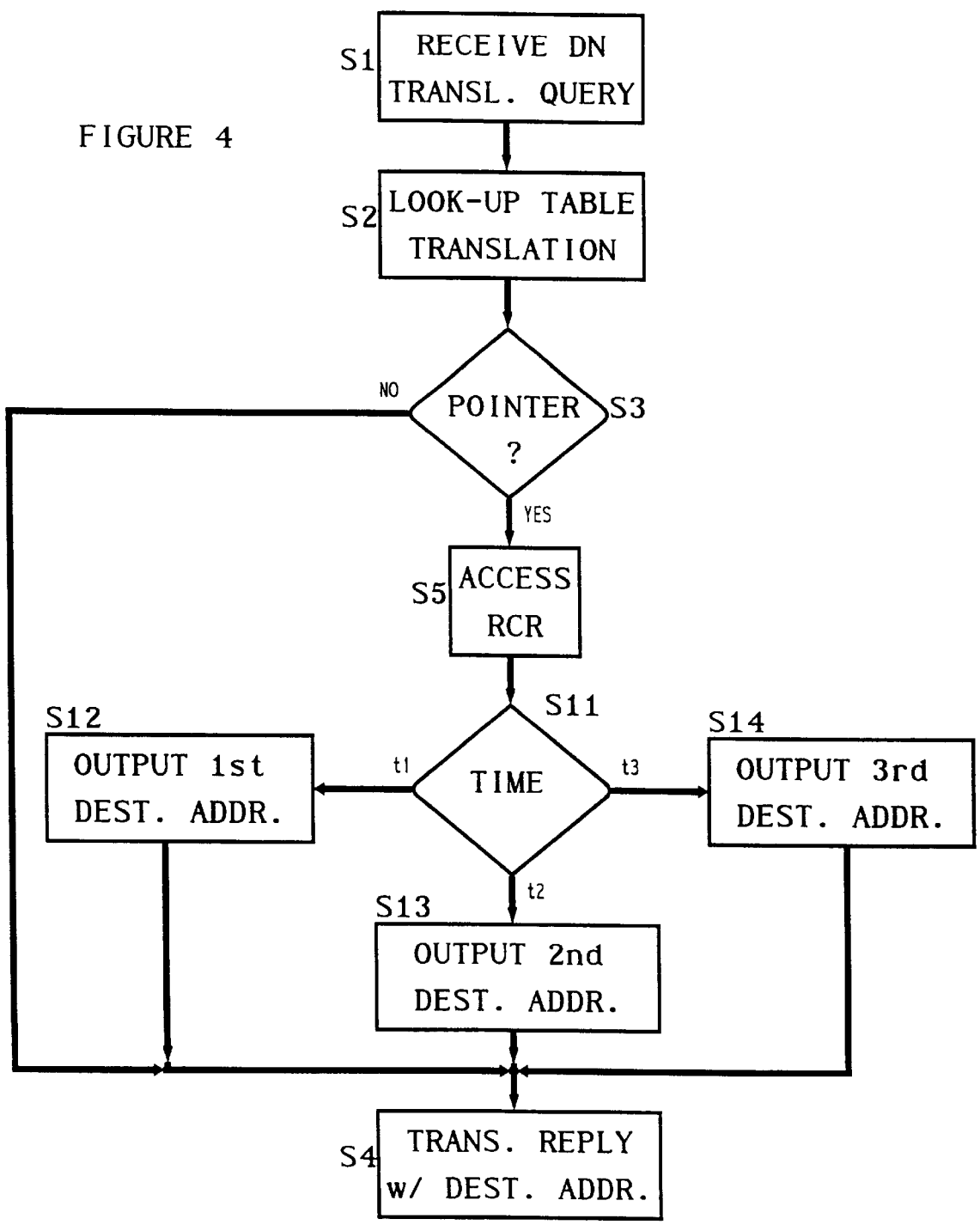
FIG. 4 is a simplified process flow diagram illustrating the conditional processing steps of a second selective routing service implemented via the present invention.

FIG. 4 provides a simplified illustration of the processing flow executed by the domain name server in response to the domain name translation query message, in this example, in response to a query from PC 21. Steps S1 to S4 are the same as in the processing of FIG. 3. However, if the translation table points to an RCR, the processing responsive to the called customer's RCR is different from that in the earlier examples. For discussion, it is assumed that the RCR defines three different time windows t1, t2, t3 and a different destination for calls occurring within each time window. For example, the customer may want calls to go to the PC 35 at a first branch office during office hours (8:00 AM to 6:00 PM) Monday through Friday in one time zone. This would be the first time window t1. Calls would go to a PC (not shown) at another branch office in a different time zone during Monday through Friday, for three hours each day after the closing of the first office. This would be the second time window t2. At all other times (t3), calls might go to a telephone 49 at some designated answering service.

To facilitate this routing, the processing by the domain name server would include a branch S11 after the access of the customer's RCR (S5). In this example, the branch follows three different paths depending on which of the three time windows covers the time of the current call. The branch could use only two time windows or any number of additional time windows, depending on the routing desired by the particular customer.

In the example, if the domain name translation request arrives at the domain name server at a time within the window t1, processing branches to step S12. The RCR causes the domain name processing to output the IP address of the first destination terminal device, the PC 35, and the domain name server transmits that address in the reply message (step S4). The PC 21 uses the received IP address to initiate voice communications with the PC 35 through the public packet data network 31. If the domain name translation request arrives at the domain name server at a time within the window t2, processing branches from step S11 to step S13. The RCR causes the domain name processing to output the IP address of the second destination terminal device, and the domain name server transmits that address in the reply message (step S4). The PC 21 uses the received IP address to initiate voice communications with that terminal device through the public packet data network 31.

If the domain name translation request arrives at the domain name server at a time within the window t3, processing branches from step S11 to step S14. The RCR causes the domain name processing to output the address of the third destination terminal device. In this case, the third destination is telephone 49. The output address therefore comprises the IP address of the appropriate PSTN gateway server 45 and the telephone number of the line going to telephone station 49 from CO 47. In the present example, the domain name server transmits the IP address of the PSTN gateway 45 and the telephone number of the line to telephone 49 to the PC 21 in step S4. The PC 21 uses the received information to establish voice communications with the alternate destination, in the same manner as in the earlier example of a voice communication call from the PC 21 to the telephone 49.

The present invention is amenable to a number of modifications and is adaptable to provide a wide range of services, in addition to the simple service examples described above.

For example, FIG. 1 depicts a single domain name server 51, and the above discussion has concentrated on a single server implementation for ease of explanation. In an actual, large scale deployment, the domain name server system would comprise a number of server systems 51 in a hierarchical arrangement. Each domain name server 51 would serve a region or segment of the public packet data network 31 and would provide translations and conditional analysis processing of names corresponding to addresses residing within the segment served. Any computer or PC on the segment requesting translation would first query the domain name server system 51 serving that segment. If the domain name was not one associated with that server, the domain name server 51 would communicate through the hierarchy of such servers to relay the query to the appropriate server for processing; and after processing, that server would provide the destination address and any associated information in the reply back to the querying device. Also, each domain name server S1 in a given area could be duplicated, for redundancy.

It should be noted that any number of useful telecommunications functions can be performed by controlling the IP address and/or other routing information returned as a result of the conditional analysis performed by the domain name server. The IP address and/or other routing information returned to the caller is determined by customized routing control records (RCRs) stored in a database in the domain name server 51. These routing programs can provide a wide range of customized routing services, in a manner similar to the services provided by call processing records used in the AIN telephone network.

A caller, for instance, could be connected to the closest equivalent address. As an example consider that a caller is trying to reach one of a chain of drug stores. The caller enters the address of one drug store that happens to be across town from her. The system could be programmed to detect that there existed another store of that chain of drug stores which was physically closer to the caller and would automatically send back the IP address of that closest store rather than the IP address of the one across town. This would provide the caller with the convenience of dealing with a closer is store.

The system could also be programmed to block access to a particular IP address unless the caller can provide a special access code. If desirable, the customized routing program could activate a special form of billing for services. In fact, any sort of conditional access data file could be set up that would control the response to the caller and/or related call processing.

Callers could be screened based on identification of the calling party's terminal. Messages or voice calls from some terminals might go through or messages or calls from some terminals might be blocked or routed to alternate destinations such as mailboxes. Messages or voice calls can be routed to alternate destinations at different times of the day, week or month.

Another type of routing permitted by the invention would enable a called party to interact with the system and select a call disposition for each incoming call, for voice or data services. In such a service, the query message that the domain name server sends to the primary terminal device could include an identification of the calling terminal. If the primary destination terminal device is live, the terminal device might display the identification to the customer along with options for call disposition. The options might include transmitting a denial message to the caller, completion to the primary destination terminal device, and routing to a selected one of several alternate destinations. The user would input a selection or even an alternate address, and the user's terminal would include the input information in the reply sent back to the domain name server. The processing by the domain name server, in turn would supply a message or address corresponding to the input selection by the user at the primary destination terminal to the calling party's terminal device. The calling party's terminal device would initiate communications in the normal manner, albeit to the destination interactively selected by the called party (assuming the called party did not select a denial message).

Also, for convenience, the above detailed discussion has emphasized calls from a PC and voice calls from a telephone capable PC. The inventive call processing methodology applies equally well to voice calls from ordinary telephones (wireline or wireless) that reach the packet data network (Internet) via a PSTN gateway server 45. The gateway server 45 acts as a telephone capable computer. The gateway server 45 queries the domain name server 52 for translation (typically for translation of a telephone number), and the call is processed thereafter in essentially the same manner as for the calls from a telephone capable PC discussed in detail above.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. A server, comprising:
    an interface for coupling the server to a system of interlinked packet data networks using packet addresses defined in a first protocol;
    a central processing unit coupled to the interface;
    a data storage system accessible by the central processing unit; and
    software running on the central processing unit, causing the server to formulate and transmit a reply to a query for translation of a name specified in a second protocol received via the interface, wherein the software controls the central processing unit to include an address of a destination terminal device conforming to the first protocol associated with the name if the server receives the query for translation within a predetermined time window.

2. A server as in claim 1, wherein the data storage system stores at least one translation table and a plurality of conditional analysis routing control records.

3. A domain name server, comprising:
    an interface for coupling the domain name server to a system of interlinked networks using the Internet Protocol (IP) addresses;
    a central processing unit coupled to the interface;
    a data storage system accessible by the central processing unit; and
    software running on the central processing unit, causing the domain name server to formulate and transmit a reply to a name translation request received via the interface, wherein the software controls the central processing unit to include an IP address of a destination terminal device associated with a name included in the name translation request if the domain name server receives the name translation request within a predetermined time window.

4. A domain name server as in claim 3, wherein the data storage system stores at least one translation table and a plurality of conditional analysis routing control records.

5. A server, comprising:
    an interface for coupling the server to a system of interlinked packet data networks using packet addresses defined in a first protocol;
    a central processing unit coupled to the interface;
    a data storage system accessible by the central processing unit; and
    software running on the central processing unit, causing the server to formulate and transmit a reply to a query for translation of a name specified in a second protocol, wherein the reply contains a telephone number associated with the name.

6. A server as in claim 5, wherein the reply also contains an address conforming to the first protocol.

7. A telecommunication system comprising:
    a system of interlinked networks using TCP/IP protocol; and
    an intelligent domain name server system coupled to the system of interlinked networks;
    said intelligent domain name server system having means capable of producing a selected one of at least two different Internet Protocol (IP) addresses for transmission in a reply responsive to a single domain name address query.

8. A telecommunication system as in claim 7, wherein the system of interlinked networks comprises the Internet.

9. A telecommunication system as in claim 7, further comprising a plurality of terminal devices coupled for data communication via the system of interlinked networks.

10. A telecommunication system as in claim 9, wherein a plurality of the terminal devices have two way voice communication capabilities.

11. A telecommunication system as in claim 7, wherein said means comprises at least one translation table and a conditional analysis routing control record.

12. A telecommunications system comprising:
    a public packet switched data network;
    at least two access servers operationally connected to the said public packet switched data network;
    at least two terminal devices operationally connected to said access servers;
    a domain name server operationally connected to the public packet switched data network, said domain name server having means capable of producing a selected one of at least two different Internet Protocol (IP) addresses for transmission in a reply responsive to a single domain name address query based on predetermined criteria.

13. A telecommunication system as in claim 12, wherein said terminal devices comprise personal computers.

14. A telecommunication system as in claim 13, wherein said personal computers comprise means for conducting two-way audio communications.

15. A telecommunication system as in claim 14, further comprising a telephone network gateway, operationally connected between the public packet switched data network and a public telephone network, for voice telephone communications.

16. A telecommunication system as in claim 12, wherein the domain name server comprises:
    an interface for coupling the domain name server to the public packet data network;
    a central processing unit coupled to the interface; and
    a data storage system accessible by the central processing unit,
    wherein said means comprises software running on the central processing unit for processing the query received via the interface and using data from the storage system to generate a reply message containing the selected IP address for transmission via the interface.

17. A telecommunication system in claim 16, wherein the data storage system stores at least one translation table and a plurality of conditional analysis routing control records.

18. A telecommunication system as in claim 12, wherein the public packet switched data network comprises the Internet.

19. A method comprising:
    receiving a name translation request at a server coupled to a public packet data network;
    translating a name included in the request into destination address information if the server receives the request within a predetermined time window; and
    transmitting a reply containing the destination address information to a calling device.

20. A method as in claim 19, wherein the address information comprises a telephone number.

21. A method as in claim 19, wherein the address information comprises an address of the public packet data network.

22. A method as in claim 21, wherein the address of the public packet data network comprises an Internet Protocol (IP) address.

23. A method as in claim 19, wherein the calling device is a terminal device.

24. A method as in claim 23, wherein the terminal device is a computer having two-way audio communication capabilities.

25. A method as in claim 19, wherein the calling device is a telephone gateway coupled between the public packet data network and a switched telephone network.

26. A method comprising:

receiving a name translation request at a server coupled to a public packet data network;

translating a name included in the request into a destination telephone number associated with a name included in the request; and transmitting a reply containing both the destination telephone number and a packet data network address of a telephone gateway coupled between the public packet data network and a telephone network through the public packet data network to a calling device.

27. A method as in claim 26, wherein the address is an Internet Protocol address.

28. A method as in claim 26, wherein the name included in the request is a textual domain name.

29. A server, comprising:

an interface for coupling the server to a system of interlinked packet data networks using packet addresses defined in a first protocol;

a central processing unit coupled to the interface;

a data storage system accessible by the central processing unit; and software running on the central processing unit, causing the server to formulate and transmit a reply to a query for translation of a name specified in a second protocol received via the interface, wherein the software controls the central processing unit to include an address of a destination terminal device conforming to the first protocol associated with the name if the server receives the query for translation within a predetermined time window, and not to include the address of the destination terminal device if the server receives the query for translation outside the predetermined time window.

30. A domain name server, comprising:

an interface for coupling the domain name server to a system of interlinked networks using the Internet Protocol (IP) addresses;

a central processing unit coupled to the interface;

a data storage system accessible by the central processing unit; and software running on the central processing unit, causing the domain name server to formulate and transmit a reply to a name translation request received via the interface, wherein the software controls the central processing unit to include an IP address of a destination terminal device associated with a name included in the name translation request if the domain name server receives the name translation request within a predetermined time window, and not to include the IP address of the destination terminal device if the domain name server receives the name translation request outside the predetermined time window.

* * * * *